US008313072B2

(12) United States Patent
Bakkom et al.

(10) Patent No.: US 8,313,072 B2
(45) Date of Patent: Nov. 20, 2012

(54) MONITOR AS A DOOR

(75) Inventors: Jeff Bakkom, Corvallis, OR (US); Todd Elkins, Albany, OR (US); Robert Curtis, New York, NY (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 828 days.

(21) Appl. No.: 12/199,665

(22) Filed: Aug. 27, 2008

(65) Prior Publication Data
US 2009/0065667 A1    Mar. 12, 2009

Related U.S. Application Data

(60) Provisional application No. 60/966,315, filed on Aug. 27, 2007.

(51) Int. Cl.
*E04G 3/00* (2006.01)
*A47F 5/00* (2006.01)

(52) U.S. Cl. ............... 248/289.11; 248/282.1; 248/917; 361/679.02; 361/679.04

(58) Field of Classification Search .......... 248/917–923, 248/341, 276.1, 281.11, 289.11, 299.1, 282.1, 248/283.1; 361/679.02, 679.04, 679.05, 361/679.06, 679.07, 679.22, 681
See application file for complete search history.

(56) References Cited

U.S. PATENT DOCUMENTS

| | | | |
|---|---|---|---|
| 4,657,316 A * | 4/1987 | Hardt et al. ................. 312/7.2 |
| 4,866,530 A * | 9/1989 | Kalua ........................... 348/383 |
| 4,919,287 A * | 4/1990 | Haskett et al. ................ 211/40 |
| 4,920,458 A * | 4/1990 | Jones ........................... 362/33 |
| 5,299,017 A * | 3/1994 | Furuno ........................ 348/786 |
| 5,321,579 A * | 6/1994 | Brown et al. ............ 361/679.06 |
| 5,348,324 A * | 9/1994 | Trotta ........................... 280/35 |
| 5,351,176 A * | 9/1994 | Smith et al. ............. 361/679.27 |
| 5,579,597 A | 12/1996 | Stewart |
| 5,636,101 A * | 6/1997 | Bonsall et al. ........... 361/679.27 |
| D390,143 S | 2/1998 | Rosen |
| 5,786,995 A | 7/1998 | Coleman |
| 5,805,117 A * | 9/1998 | Mazurek et al. ............ 345/1.3 |
| 6,054,968 A * | 4/2000 | De Matteo .................. 312/7.2 |
| 6,359,775 B1 | 3/2002 | Revis |
| 6,594,078 B2 * | 7/2003 | Clifton et al. ............... 359/449 |
| 6,688,518 B1 | 2/2004 | Valencia et al. |
| 6,692,093 B1 * | 2/2004 | Park et al. ................. 312/405.1 |
| 6,841,790 B1 * | 1/2005 | Phillips et al. ............ 250/504 R |
| 6,883,563 B2 * | 4/2005 | Smith ........................... 141/94 |
| 6,989,800 B2 * | 1/2006 | McLaughlin .............. 345/1.3 |
| 7,019,786 B2 * | 3/2006 | Lee ............................. 348/383 |
| 7,176,380 B2 * | 2/2007 | Tufano et al. ................. 174/66 |

(Continued)

FOREIGN PATENT DOCUMENTS
WO     9811479 A1     3/1998
(Continued)

*Primary Examiner* — Tan Le

(57) ABSTRACT

A multiple monitor array includes a support structure; a plurality of monitors supported by the support structure wherein at least one monitor serves as a door for accessing objects disposed behind the at least one monitor; a hinge structure interposed between the support structure and the at least one monitor allowing the at least one monitor serving as a door to pivot about the hinge structure; a releasable fastener configured to secure the at least one monitor serving as a door to the support structure; and an alignment mechanism configured to return the at least one monitor serving as a door to an aligned orientation and position with respect to the monitor array when the at least monitor serving as a door is closed.

20 Claims, 9 Drawing Sheets

U.S. PATENT DOCUMENTS

| | | | |
|---|---|---|---|
| 7,334,766 B2 * | 2/2008 | Ligertwood | 248/292.13 |
| 7,408,596 B2 * | 8/2008 | Kunz | 348/837 |
| 7,430,111 B2 * | 9/2008 | Lee et al. | 361/679.27 |
| 7,438,269 B2 * | 10/2008 | Pfister et al. | 248/292.14 |
| 7,510,156 B1 * | 3/2009 | Yaeger | 248/284.1 |
| 7,513,469 B1 * | 4/2009 | Ciungan | 248/161 |
| 7,546,745 B2 * | 6/2009 | Lee et al. | 62/125 |
| 7,661,643 B2 * | 2/2010 | Oh | 248/289.11 |
| 7,663,706 B2 * | 2/2010 | Ryu | 348/836 |
| 7,712,717 B2 * | 5/2010 | Burns | 248/291.1 |
| 7,719,480 B2 * | 5/2010 | Devos et al. | 345/1.3 |
| 7,780,124 B2 * | 8/2010 | Wang | 248/122.1 |
| 7,866,622 B2 * | 1/2011 | Dittmer | 248/421 |
| 7,869,201 B2 * | 1/2011 | McCoy et al. | 361/679.07 |
| 7,891,622 B1 * | 2/2011 | O'Keene | 248/292.13 |
| 2003/0039094 A1 * | 2/2003 | Sarkinen et al. | 361/681 |
| 2003/0090866 A1 | 5/2003 | Kuo | |
| 2003/0154673 A1 * | 8/2003 | MacGregor et al. | 52/239 |
| 2004/0212745 A1 | 10/2004 | Chang | |
| 2006/0238967 A1 * | 10/2006 | Carson et al. | 361/681 |
| 2006/0243872 A1 * | 11/2006 | Benzi | 248/282.1 |
| 2007/0007411 A1 * | 1/2007 | Richards et al. | 248/276.1 |
| 2007/0170325 A1 * | 7/2007 | Ryu | 248/276.1 |
| 2007/0252060 A1 * | 11/2007 | McPherson | 248/282.1 |
| 2008/0123284 A1 * | 5/2008 | Jaramillo et al. | 361/686 |
| 2009/0184221 A1 * | 7/2009 | Sculler | 248/221.11 |
| 2010/0171014 A1 * | 7/2010 | Stemple | 248/201 |
| 2011/0002129 A1 * | 1/2011 | Zheng et al. | 362/375 |

FOREIGN PATENT DOCUMENTS

| | | |
|---|---|---|
| WO | 9821096 A1 | 5/1998 |
| WO | 03071406 A2 | 8/2003 |

* cited by examiner

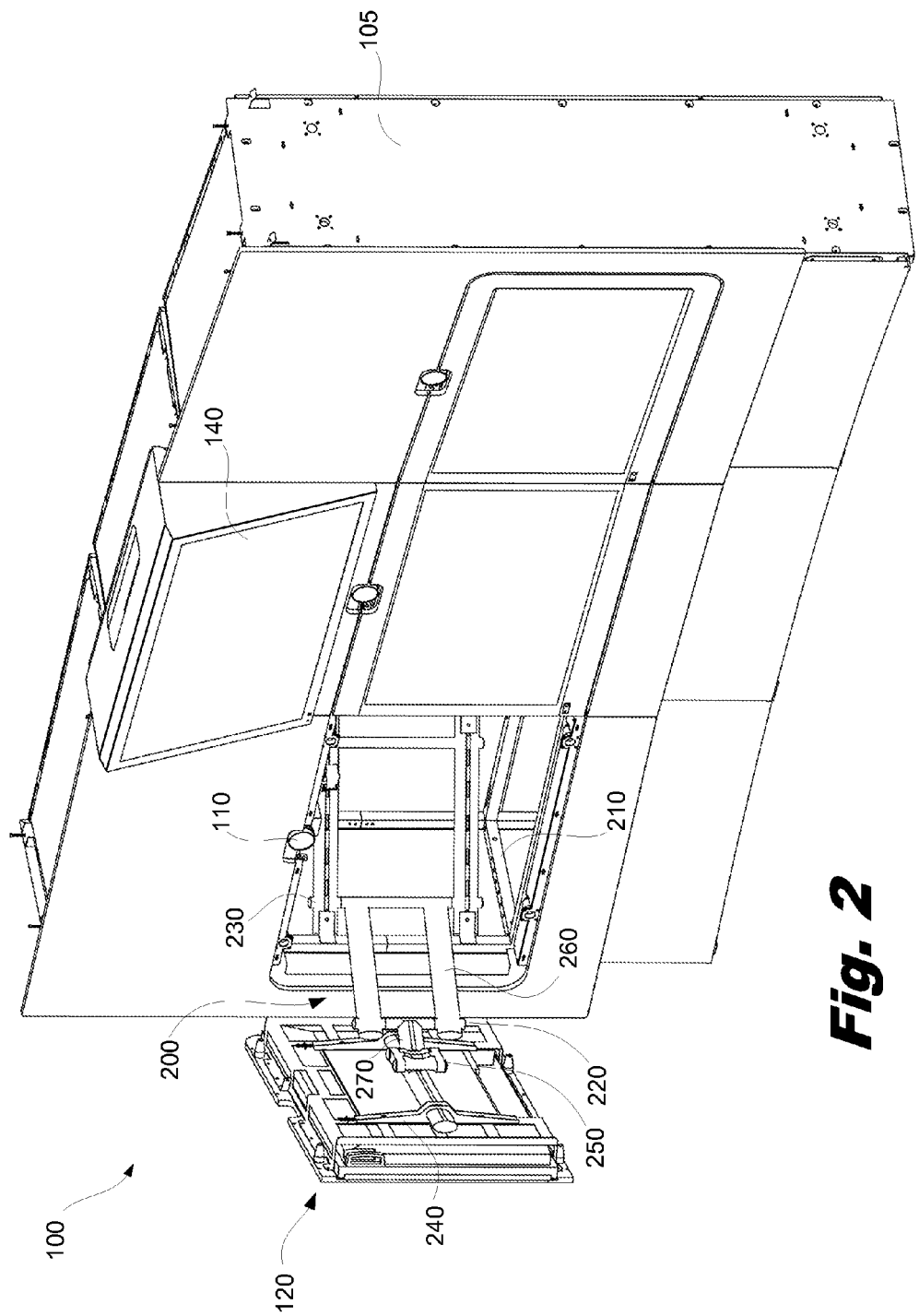

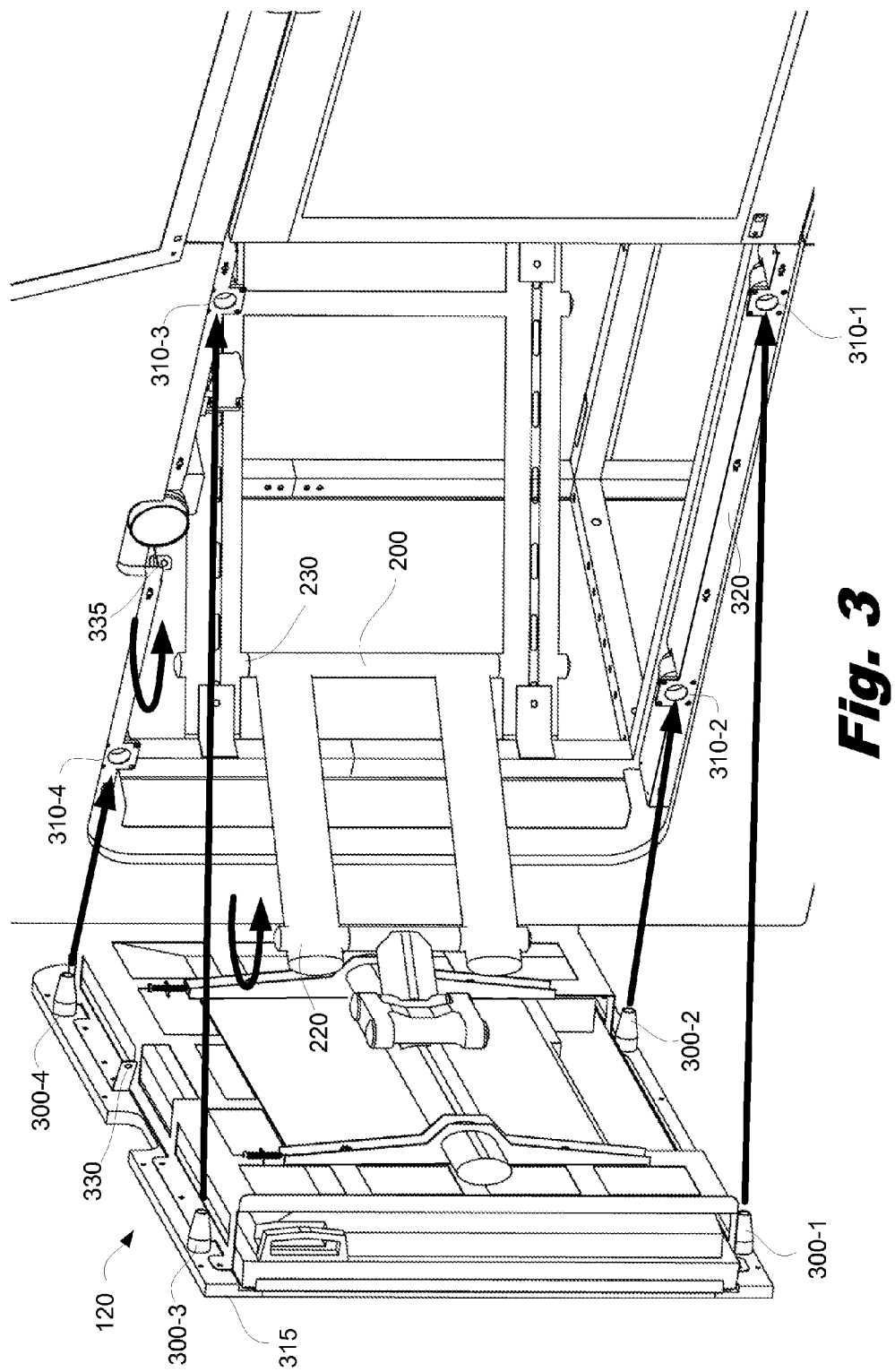

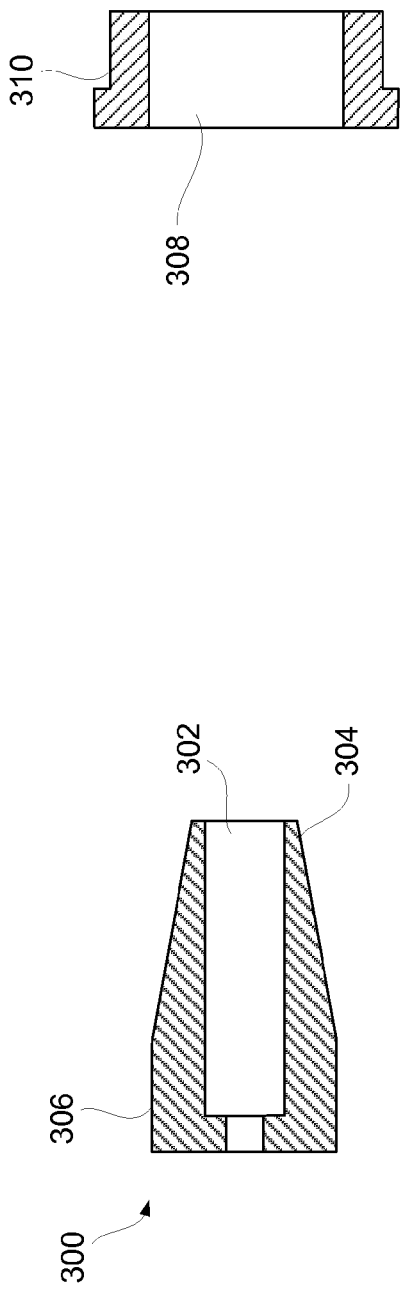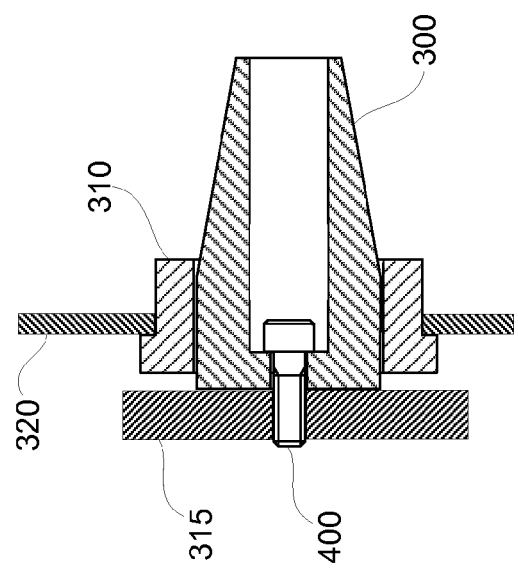
Fig. 4b
Fig. 4c
Fig. 4a

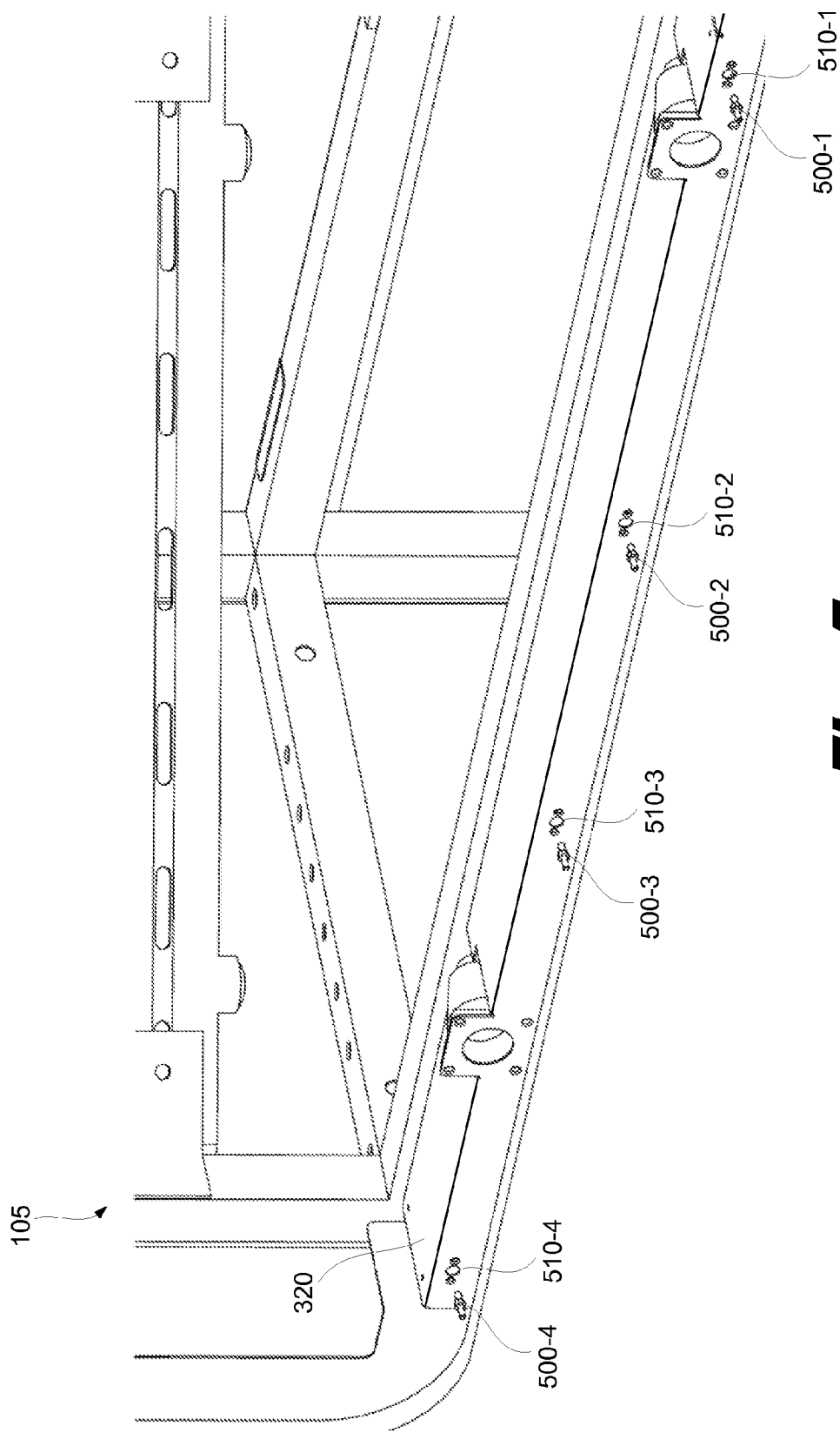

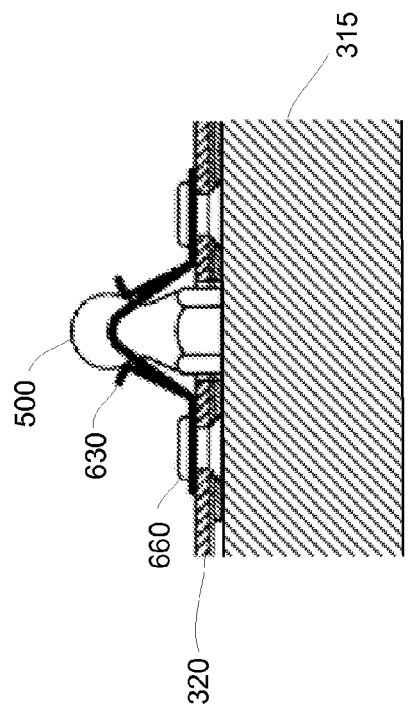
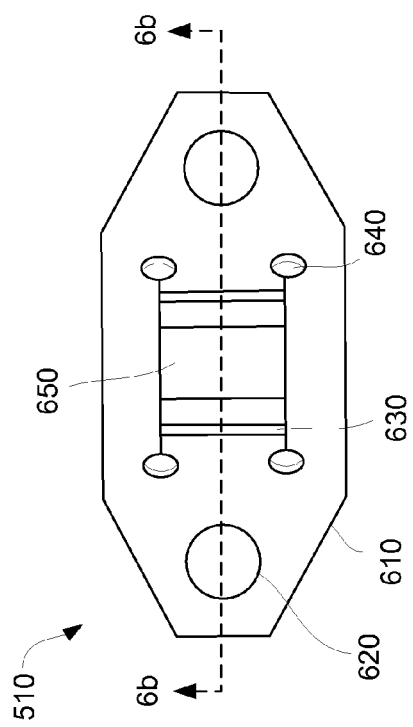
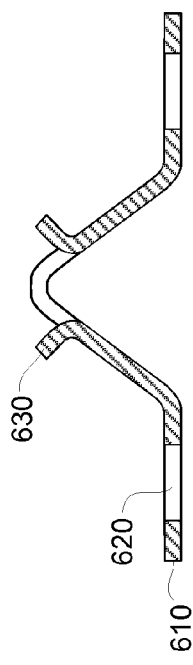

MONITOR AS A DOOR

RELATED APPLICATION

The present application is related to and claims the priority under 35 U.S.C. §119(e) of U.S. Provisional Patent Application No. 60/966,315, entitled "Monitor as a Door," filed Aug. 27, 2007, which previous application is hereby incorporated by reference in its entirety.

BACKGROUND

The increasing integration of visual displays with cameras, multiple speakers, lighting, and various display electronics such as Digital Video Disc (DVD) players, satellite tuners, and other electronics have led to a proliferation of cables and electronics that can be present in a multimedia display environment. With the advent of liquid crystal display (LCD) and plasma monitors, integrated visual displays are often incorporated into walls or other structures for a more esthetically pleasing appearance and to minimize the intrusion of the display into living or working areas. Further, several separate monitors are often integrated into a monitor array for advertising, data display, and telepresence applications. This further increases the number cables and support electronics in the integrated visual display.

To create the best visual presentation and human environment, the supporting cables and electronics are generally hidden from view. Safety concerns may also prefer that these cables and electronics be out of the way. To accomplish these objectives, the cables and support electronics are generally placed behind the displays and integrated into the display support structure.

Consequently, access to the components of the integrated visual display can severely restricted by the support structure, tight spaces, and the monitor itself. This difficulty in accessing the components can be a significant inconvenience when repairing or upgrading an integrated visual display. Access can be particularly restricted in multiple monitor array applications where the multiple monitors are closely joined to give the visual appearance of a continuous display surface. Further, access to the sides and rear of the multiple monitor array can be limited. To minimize the intrusion of these large displays on floor space, the multiple monitor arrays often tightly integrated into the office or display areas, resulting in little or no free space in the rear and sides of the display. Providing a method of easily accessing cables, support electronics, and other components is important for integrated visual displays.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 2 is a perspective view of one illustrative embodiment of a multiple monitor array with one monitor serving as a door being disposed in an open position, according to principles described herein.

FIG. 3 shows one illustrative system for returning an opened monitor a closed and aligned position, according to principles described herein.

FIGS. 4*a*-4*c* show one illustrative embodiment of an alignment mechanism including cone and receptacle system for returning an open monitor to an aligned position, according to principles described herein.

FIG. 5 shows one illustrative system for securing a monitor to a support structure, according to principles described herein.

FIGS. 6*a*-6*c* show one illustrative embodiment of a releasable fastener including ball studs and spring clips for securing a monitor to a support structure, according to principles described herein.

Throughout the drawings, identical reference numbers designate similar, but not necessarily identical, elements.

DETAILED DESCRIPTION

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Access to connections, cables, and other support electronics, along with physical support structures contained within an integrated visual display can be provided by using a monitor as an access door. The monitor is configured to be swung away from the support structure such that the opening behind the monitor serves as an access point. Particularly, where the monitor has a large display surface, the exposed opening is correspondingly large and especially effective in providing access to the structure and components hidden behind the monitor.

Relevant design considerations in utilizing a monitor as an access door include: supporting the monitor as it is swung away from the support structure, securing the monitor to the support structure in a safe and secure manner that also allows the monitor to be easily released and rotated out of the way, and returning the monitor to an aligned position with respect to the support structure or to a monitor array of which the monitor/door is a part.

Figure 1:
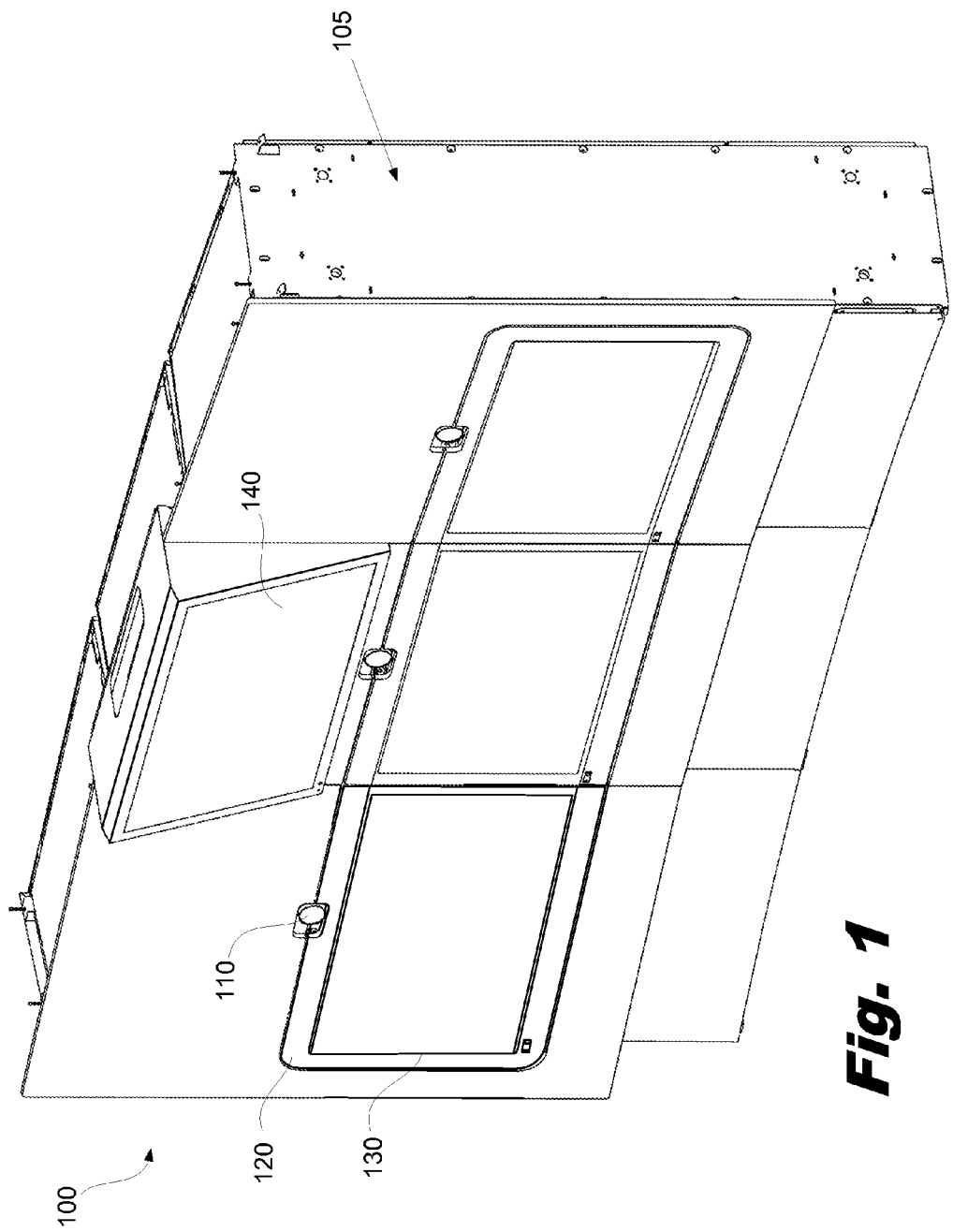
FIG. 1 is a perspective view of one illustrative embodiment of a multiple monitor array, according to principles described herein.

FIG. 1 shows an illustrative embodiment of a multiple monitor array (100). The multiple monitor array (100) comprises a support structure (105) and multiple adjoining monitors (120) arranged such that the display areas (130) of the monitors (120) are adjacent and aligned so as to, in some cases, function together as a single enlarged display surface. In the illustrated embodiment, a fourth monitor (140) resides above the other monitors (120) and provides an additional non-contiguous display area.

The illustrated monitor array (100) may be used, for example, as an advertising display or as part of a video conferencing system. In either case, one or more cameras (110) may be disposed within the support structure (105) to provide imagery of objects and people in front of the monitor array (100). This may allow an advertising display to respond to the people in front of and viewing the display or, alternatively, provides video to be transmitted to a remote location that is part of a teleconferencing to telepresence system.

As mentioned above, a multiple monitor array is often tightly integrated into a room or office space. For example, the multiple monitor array could be positioned against a wall and/or span the breath of a room. This minimizes the footprint of the array, but restricts access to the rear and sides.

Nevertheless, access to the electronics, connections, support structure and adjustments behind the monitors may be needed for maintenance, repair, fine-tuning and upgrading the system. However, without an additional means for accessing such internal components, a technician must remove or disassemble the system, or the unit must be positioned with excess space in the sides and rear of the system so that a technician can move behind the unit.

FIG. 2 is a perspective view of one illustrative embodiment of a multiple monitor array (100) with one monitor (120) that serves as an access door being disposed in an open position. In the open position, the display surface (130, FIG. 1) is on the opposite side of monitor (120) and is not shown in this figure.

The monitor (120) swings away from the support structure (105) by means of an arm assembly (200) which is attached to internal support members (210). The arm assembly (200) has a shoulder joint (230), an elbow joint (220), and wrist joint (250). The shoulder joint (230) is interposed between the support structure (105) and a first rigid arm segment (260). The elbow joint (220) is interposed between the first rigid arm segment (260) and a second rigid arm segment (270). The wrist joint (250) attaches the second rigid arm segment to a support bracket (240). The support bracket (240) is attached to the rear of the monitor (120) by screws. Adjustment mechanisms are interposed between the support bracket (240) and the monitor (120) to allow for the fine adjustment of the monitor's position.

The arm assembly (200) allows the monitor (120) to swing away from the support structure (105), creating an opening for convenient access to internal electronics, cabling, adjustment mechanisms and support structure. As indicated above, this facilitates maintenance, repairs, upgrades, and troubleshooting of the multiple monitor array (100) and associated support electronics and structures.

However, in many embodiments, the arm (200) has more alignment variation that is desirable. Particularly, off-the-shelf arms are not necessarily designed to return the monitor to a precisely aligned position after the monitor (120) has been opened. A precision arm could be designed with the necessary stiffness and repeatability required to return the monitor (120) to an aligned position. However, the precision arm would be much heavier and expensive than other designs.

FIG. 3 illustrates an illustrative system for realigning a monitor (120) which has been opened to serve as an access point. To return the monitor (120) to its aligned and closed position, a hinge structure is used. The hinge structure or means can be any of a variety of hinge structures including, but not limited to a piano-style hinge or an articulated hinge.

The illustrated example is of an articulated hinge structure comprising multiple hinged joints (220, 230) that rotate as indicated by the curved arrows. The rotation about the hinged joints brings the monitor (120) into contact with the support structure (105). Four alignment cones (300-1, 300-2, 300-3, and 300-4) then make contact with corresponding receptacles (310-1, 310-2, 310-3, and 310-4). The cones are mounted to a face plate (315) and the receptacles (310) are mounted to a sheet metal bracket (320) that is secured to the support structure (105, FIG. 2). The cones (300) have a characteristic taper which gradually engages the inner surface of the receptacles (310). As the cones (300) penetrate deeper into the receptacles (310), the monitor (120) is brought back into precise alignment with the support structure (105).

A locking feature can be incorporated into the door mechanism. In one illustrative embodiment, a first sheet metal tab (330) has a hole configured to receive and retain a captive screw (not shown). When the monitor is closed the captive screw (not shown) aligns with a corresponding threaded hole (335) that is attached to the support structure (105). The screw can then be tightened with a screw driver to lock the monitor in place. This screw locking feature makes the monitor access point "Tool Accessible Only," which prevents casual bystanders from opening the monitor (120). When maintenance personnel need to gain access only one screw needs to be loosened. The screw location can be chosen such that there is easy access but it is hidden from view, making it aesthetically pleasing and also more difficult for someone without prior knowledge to gain access. For greater security, a tamper proof screw could be used. Tamper proof screws are commonly available such as Tri-Groove, drilled spanner, or Pin-in-Torx heads. Depending on the display environment, other security measures could be taken. By way of example and not limitation, a key and lock mechanism can be installed to prevent unauthorized people from opening the access point.

FIGS. 4a-4c show cross-sectional diagrams of one illustrative embodiment of an alignment mechanism or means, including a cone (300) and receptacle (310), for returning an open monitor to an aligned position. The cone (300) has a tapered cross-section that begins with a small frontal diameter (304) and gradually increases in diameter until it reaches the major diameter of the cone (306). The cone (300) has a stepped central bore (302) that is configured to receive a fastener. The receptacle (310) has a central bore (308) of a slightly larger diameter than the major diameter of the cone (306).

FIG. 4c shows a cross-sectional diagram of a mounted cone (300) received within a mating receptacle (310). The cone is mounted to the face plate (315) by a screw (400) or other similar fastener. The face plate (315) is rigidly attached to the monitor (120, FIG. 2). The receptacle (310) is mounted to the sheet metal bracket (320) which is rigidly attached to the support structure (105, FIG. 2). If the monitor (120, FIG. 2) is slightly out of alignment with the support structure (105, FIG. 2) when it is returned to the closed position, the small frontal diameter (304) of the cone enters the substantially larger central bore (309) of the receptacle. As the monitor (120, FIG. 2) continues to move toward the support structure (105, FIG. 2) the perimeter of the cone contacts the inner surface of the central bore (308). The central bore guides the cone (300) into complete alignment as shown in FIG. 4c. When the major diameter of the cone (306) is within the central bore (308) of the receptacle, the monitor has returned to its original and proper alignment.

By using alignment cones and corresponding receptacles, the monitor can be quickly and easily returned to its aligned position. This is particularly important in a multiple monitor array. Even slight misalignments result in discontinuities between the images displayed on adjacent monitors. Further, the orientation of the monitors is important to the esthetic nature of the multiple monitor array. Slight gaps between the monitors and the surrounding trim or facing can be unsightly and distracting.

The cone angle can be chosen such that the ratio of cone frontal diameter (304) to the major diameter of the receptacle central bore (308) will accommodate the worst case misalignment between the monitor (120) and the support structure (105). This assures the cone (300) will always be able to engage the receptacle (310) when the monitor is opened and closed.

The difference between cone major diameter (306) and receptacle central bore (308) is selected such that the alignment error is less than the allowable variation in alignment between monitors in the monitor array when in the closed position. This assures the required alignment will always be maintained when the monitor is in the closed position.

FIG. 5 illustrates an illustrative system for securing the monitor (120, FIG. 2) to the support structure (105). The ball studs (500) are attached to the face plate (315, FIG. 3) and the spring clips (510) are attached to a sheet metal bracket (320). In this embodiment, a plurality of ball studs (400-1, 400-2, 400-3 and 400-4) pass through holes in the sheet metal bracket (320) and are received by spring clips (410-1, 410-2, 410-3 and 410-4) fastened to a rear side of the bracket (405). The ball stud snaps securely retain the monitor (120, FIG. 2) in a desired position without interfering with the alignment produced by the cones/receptacles. In one illustrative embodiment, four ball assemblies are located along the bottom edge of the monitor and four ball studs snap assemblies are located along the top edge of the monitor.

The ball stud fastening method allows the monitor to be simply and securely attached to the support structure. In particular, the ball stud fastening system avoids exposed handles or other mechanisms that can be esthetically undesirable and/or intrude on the display's surface.

FIGS. 6a, 6b, and 6c show one illustrative embodiment of a releasable fastener including ball studs and spring clips for securing a monitor to a support structure. These figures, in particular, show one illustrative embodiment of the ball stud (500) and its accompanying spring clip (510).

As shown in FIG. 6a, the spring clip (510) can be formed of a resilient material such as sheet metal that is configured to detachably receive a ball stud (500). The spring clip (510) consists of a base (610) with a plurality of fastening apertures (620). The center of the spring clip (510) contains rectangular aperture (650) through which the ball stud (500) is received. Relief apertures (640) facilitate the manufacturing process and prevent stress concentrations that would weaken the spring clip (510). The dashed line (6b) shows the center line which defines the sectioning plane of FIG. 6b. As shown in FIG. 6b, the center of the spring clip (510) is bent upward and outward to form a rectangular aperture (650) through which the ball stud (500) is received. The edges of the rectangular opening (650) are bent outward to form flange (630).

FIG. 6c is an illustration of one embodiment of a releasable fastener or securing means for securing a monitor that is serving as a door to the underlying support structure. In the illustrated example, the releasable fastener or securing means includes a ball stud (500) that is received in a corresponding receiver, e.g., a spring clip (510). The ball stud (500) is mounted to the face plate (315) and the spring clip (510) mounted to the sheet metal bracket (320). The spring clip (510) is mounted to the sheet metal bracket (320) with fasteners (660) that pass through the fastening apertures (620).

When the monitor (120, FIG. 2) is brought into the closed position, the ball stud (500) passes through a hole in the sheet metal bracket (320) and enters the rectangular aperture (650) in the central portion of the spring clip (510) where the ball portion of the stud (500) is captured by the outwardly bent flanges (630). The force of the outwardly bent flanges (630) on the perimeter of the ball stud (500) securely retains the monitor in position. The monitor (120, FIG. 2) may be swung away from a support structure (105, FIG. 2) by applying sufficient force to open the outwardly bent flanges (630) and disengage the ball studs (500).

Using a ball stud locking mechanism securely retains the monitor in a position without interfering with the alignment produced by the alignment cones/receptacles. Further, the ball stud locking mechanisms do not require a visible fastening release mechanism, preserving the uniform appearance of the monitor array.

Figure 7:
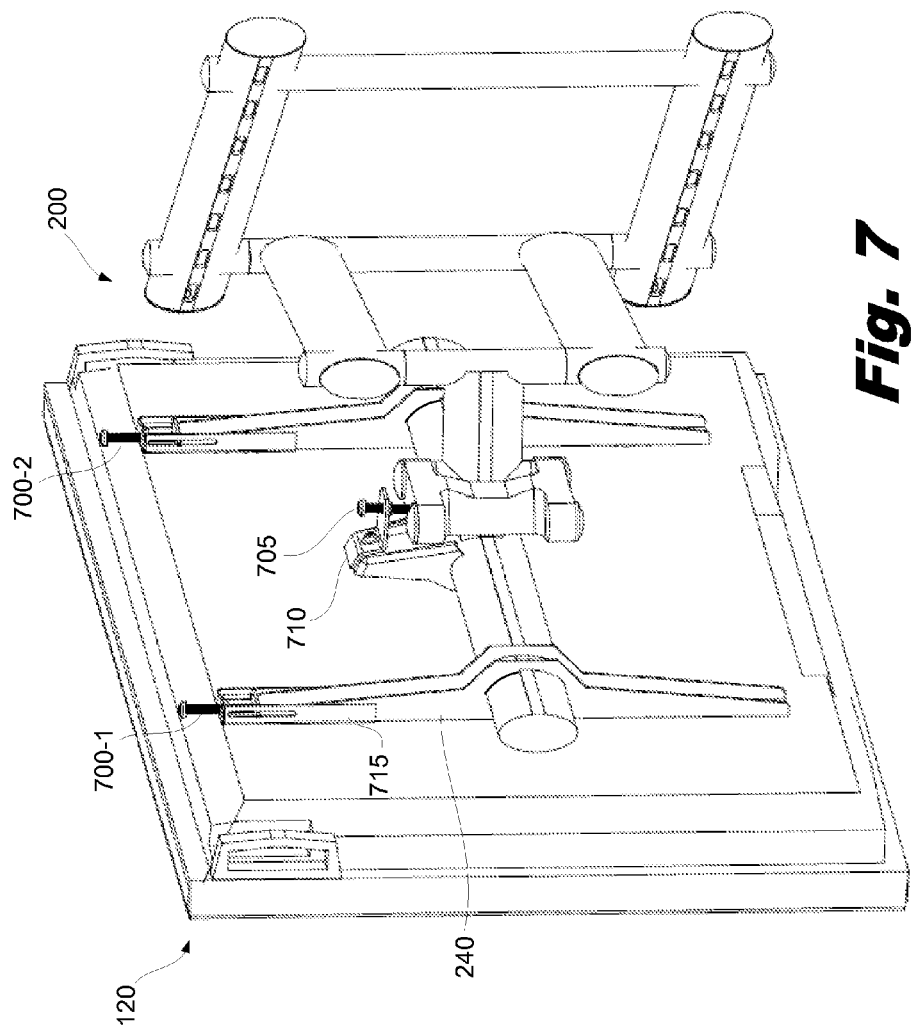
FIG. 7 shows one illustrative adjustment system which can be used to position a monitor with respect to a support structure, according to principles described herein.

FIG. 7 illustrates one illustrative adjustment system that can be used to position a monitor with respect to the support structure of a multiple monitor array. For clarity of illustration, other components such as the cones (500) and ball studs (510) are not shown in this figure.

Monitors in a multiple monitor array, particularly when the monitor array is part of an advertising display or telepresence studio, must be precisely aligned to preserve the continuity of the images across the monitor array. Monitors that are used as a door are more likely to lose alignment due to changes of position, vibration, and handling. Easily accessible alignment and locking mechanisms are an important design consideration when using the monitor as a door.

Figure 8B:
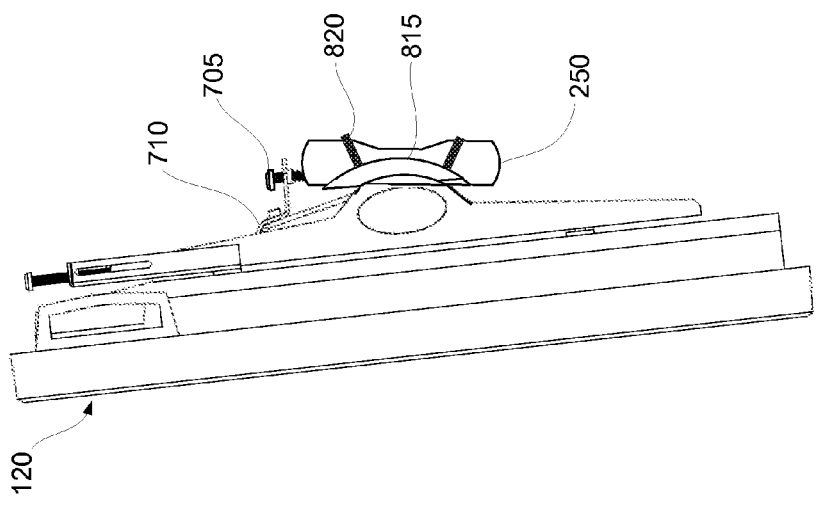
FIGS. 8*a* and 8*b* show one illustrative adjustment mechanism that can be used to position a monitor with respect to a support structure, according to principles described herein.
Figure 8A:
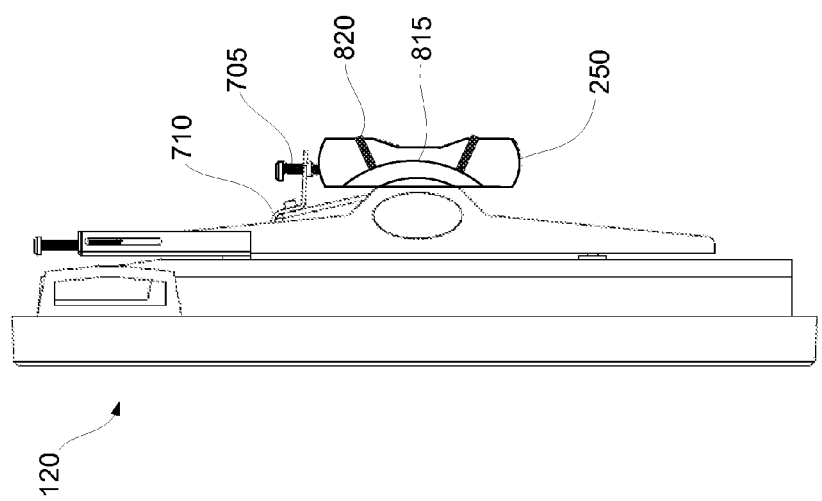

One illustrative embodiment of a mechanism configured to adjust the pitch of a monitor is shown FIGS. 8a and 8b. FIG. 8a shows a screw (705) threaded into a bracket (710) which is attached to the rear of a monitor (120). The tip of the screw (705) pushes against the wrist joint (750) and can thus be used to control the pitch of the monitor (120).

To make a pitch adjustment to the monitor's position, set screws (820) that pass through the wrist joint are loosened to allow for movement of the monitor (120) relative to the bracket (710). The pitch adjustment screw (705) is then threaded into or out of the bracket (710), which changes the position of the bracket (710) with respect to the wrist joint (250). A semicircular protrusion (815) slides in a matching groove in the wrist joint (250), allowing the monitor to tilt as the pitch angle is adjusted.

FIG. 8b shows the pitch angle adjusted downward so that the monitor is in a new orientation. To make this downward adjustment to the pitch angle, the screw (705) is threaded into the bracket (710). After the monitor (120) is in the desired position, the set screws (820) that pass through the rear of the wrist joint (250) are tightened, locking the semicircular protrusion (815) in place.

Figure 9A:
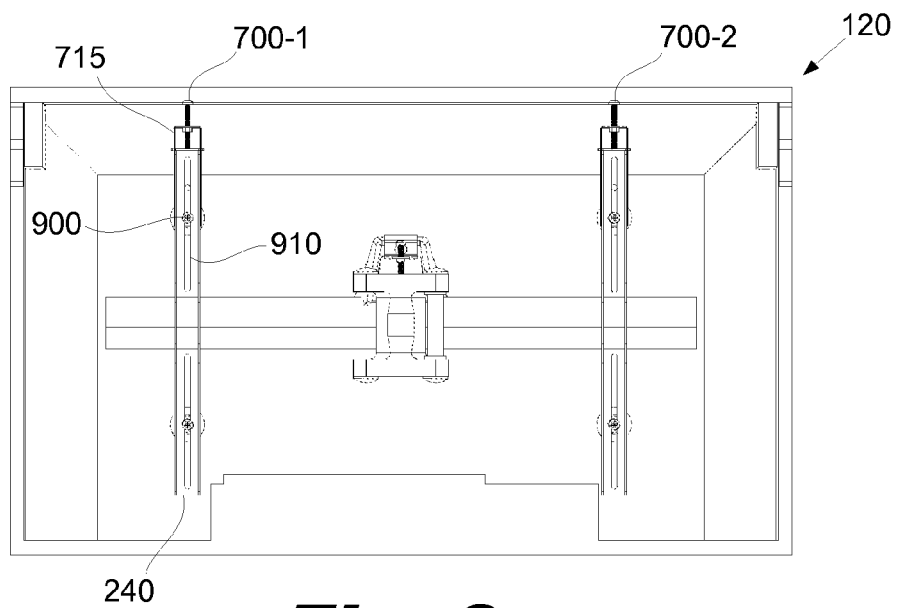
FIGS. 9*a* and 9*b* show one illustrative adjustment mechanism that can be used to position a monitor with respect to a support structure, according to principles described herein.
Figure 9B:
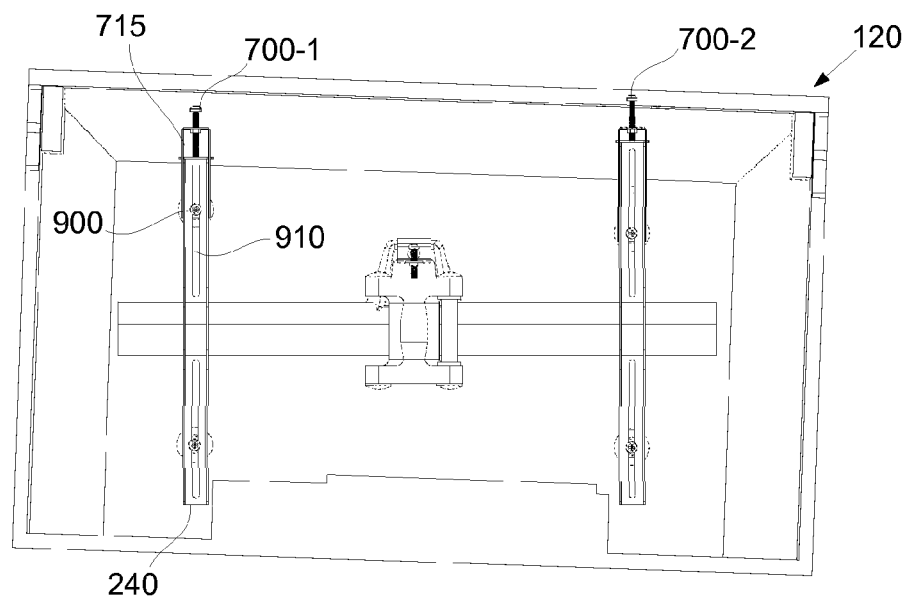

FIGS. 9a and 9b illustrate a second fine adjustment mechanism that allows two additional degrees of motion in the alignment of the monitor (120). FIG. 9a shows a pair of jack screws (700-1, 700-2) configured to adjust the elevation and rotation of the monitor (120) with respect the support bracket (240). A jackscrew mechanism uses a threaded rod which positions a matching nut anywhere along its length. Forces acting along the length of the rod do not appreciably affect the rotation of the rod, resulting in a self locking mechanism. If the jack screws (700-1, 700-2) are adjusted in equal amounts, the height of the monitor with respect to the support bracket will be adjusted. Alternatively, if the jack screws (700-1, 700-2) are adjusted unequally, the monitor will rotate about a roll axis that extends perpendicularly through the viewing surface.

In FIG. 9a, the monitor (120) is shown attached to the support bracket (240). To make an adjustment to the monitor using the jackscrews (700-1, 700-2), the mounting screws (900) are first loosened. The mounting screws (900) pass through a slot (910) in the support bracket (240), then through a hole in the jack screw fixture (715), and then into the threaded mounting hole in the back of the monitor (not shown). By loosening the mounting screws (900), the mounting screws can slide up and down in the slots (910) in the support bracket in response to the adjustment of the jack screws (700-1, 700-2).

In FIG. 9b, the left jack screw (700-1) has been screwed into the jack screw fixture (715), which lifts the left side of the monitor (120). The right jack screw (700-1) has been screwed out of its corresponding jack screw fixture (715), which lowers the right side of the monitor (120). Consequently, the monitor (120) has been adjusted about the roll axis. After the jack screw adjustment is complete, the mounting screws (900) are tightened, locking the monitor (120) into position.

These threaded alignment mechanisms provide fine adjustment capability which allows the monitor (120) to be precisely aligned and locked into position relative to the support structure. These fine alignment mechanisms are easily accessible when the monitor (120) is swung away from the support member. The fine alignment mechanisms compliment the current monitor alignment solutions that are provided with off-the-shelf arm mechanisms, such as slotted fastening systems and set screws.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A multiple monitor array comprising: a support structure comprising an opening providing access to objects behind an exterior of said support structure; a plurality of monitors supported by said support structure wherein at least one monitor serves as a door for accessing objects disposed behind said at least one monitor, said at least one monitor that serves as a door covering at least a portion of said opening when in a closed position; a hinge structure interposed between said support structure and said at least one monitor allowing said at least one monitor serving as a door to pivot about said hinge structure between an open position and said closed position; a releasable fastener configured to secure said at least one monitor serving as a door to said support structure; and an alignment mechanism configured to return said at least one monitor serving as a door to an aligned orientation and position with respect to said monitor array when said at least monitor serving as a door is closed, wherein said alignment mechanism includes a plurality of cones attached to said at least one monitor and a plurality of receptacles attached to said support structure, and wherein said plurality of receptacles are configured to detachably receive said plurality of cones.

2. The multiple monitor array of claim 1, further comprising: a fine adjustment mechanism configured to adjust a position of said at least one monitor with respect to said hinge structure.

3. The multiple monitor array of claim 2, wherein said fine adjustment mechanism comprises: a plurality of jack screws configured to adjust an elevation and roll degrees of freedom of said at least one monitor with respect to said hinge structure.

4. The multiple monitor array of claim 3, wherein said fine adjustment mechanism further comprises: a bracket attached to a rear of said at least one monitor; and a screw threaded through said bracket such that when said screw is threaded into or out of said bracket a tilt of said at least one monitor is adjusted.

5. The multiple monitor array of claim 4, wherein said fine adjustment mechanism further comprises a plurality set screws, said set screws configured to be engaged as locking devices to secure said monitor.

6. The multiple monitor array of claim 5, further comprising a locking mechanism configured to restrict access to said objects disposed behind said at least one monitor.

7. The multiple monitor array of claim 6, wherein said locking mechanism further comprises: a captive screw, a first tab, said first tab attached to said monitor, said first tab being configured to receive and retain said captive screw; and a second tab, said second tab attached to said support structure, said second tab having a threaded hole configured to receive said captive screw.

8. A method of providing a multiple monitor array comprising:
arranging a plurality of monitors supported by a support structure comprising an opening providing access to objects behind an exterior of said support structure, wherein at least one monitor serves as a door for accessing objects disposed behind said at least one monitor, said at least one monitor that serves as a door covering at least a portion of said opening when in a closed position;
installing a hinge structure interposed between said support structure and said at least one monitor allowing said at least one monitor serving as a door to pivot about said hinge structure between an open position and said closed position;
providing a releasable fastener configured to secure said at least one monitor serving as a door to said support structure, wherein said releasable fastener includes a plurality of ball studs connected to said at least one monitor and a plurality of spring clips connected to said support structure and said plurality of spring clips being configured to detachably receive said plurality of ball studs;
and providing an alignment mechanism configured to return said at least one monitor serving as a door to an aligned orientation and position with respect to said monitor array when said at least monitor serving as a door is closed.

9. The method of claim 8, further comprising: providing a fine adjustment mechanism configured to adjust a position of said at least one monitor with respect to said hinge structure.

10. A multiple monitor array comprising:
a support structure comprising an opening providing access to objects behind an exterior of said support structure;
a plurality of monitors supported by said support structure wherein at least one monitor serves as a door for accessing objects disposed behind said at least one monitor, said at least one monitor that serves as a door covering at least a portion of said opening when in a closed position;
a hinge means, interposed between said support structure and said at least one monitor, for allowing said at least one monitor serving as a door to pivot between an open position and said closed position;
a securing means for securing said at least one monitor serving as a door to said support structure, wherein said securing means includes a plurality of ball studs connected to said at least one monitor and a plurality of spring clips connected to said support structure, and wherein said plurality of spring clips are configured to detachably receive said plurality of ball studs;

and an alignment means for returning said at least one monitor serving as a door to an aligned orientation and position with respect to said monitor array when said at least monitor serving as a door is closed.

11. The multiple monitor array of claim 10, wherein said hinge means comprise: an arm segment; a first joint disposed between said arm segment and said support structure; and a second joint disposed between rigid arm segment and said at least one monitor.

12. The multiple monitor array of claim 10, wherein said alignment means comprise: a plurality of cones attached to said at least one monitor, a plurality of receptacles attached to said support structure, said plurality of receptacles being configured to detachably receive said plurality of cones.

13. The multiple monitor array of claim 10, further comprising: a fine adjustment means for adjusting a position of said at least one monitor with respect to said hinge means.

14. The multiple monitor array of claim 13, wherein said fine adjustment means comprise: a plurality of jack screws configured to adjust an elevation and roll degrees of freedom of said at least one monitor with respect to said hinge structure; a bracket attached to a rear of said at least one monitor; and a screw threaded through said bracket such that when said screw is threaded into or out of said bracket a tilt of said at least one monitor is adjusted.

15. The multiple monitor array of claim 1, wherein said plurality of monitors are arranged contiguously.

16. The multiple monitor array of claim 1, wherein said hinge structure is arranged on one side of said opening to facilitate access to said objects behind the exterior of said support structure through said opening.

17. A multiple monitor array comprising:
a support structure comprising an opening providing access to objects behind an exterior of said support structure;
a plurality of monitors supported by said support structure wherein at least one monitor serves as a door for accessing objects disposed behind said at least one monitor, said at least one monitor that serves as a door covering at least a portion of said opening when in a closed position;
a hinge structure interposed between said support structure and said at least one monitor allowing said at least one monitor serving as a door to pivot about said hinge structure between an open position and said closed position such that said hinge structure includes an arm segment, a first joint disposed between said arm segment and said support structure, and a second joint disposed between rigid arm segment and said at least one monitor;
a releasable fastener configured to secure said at least one monitor serving as a door to said support structure, wherein said releasable fastener includes a plurality of ball studs connected to said at least one monitor and a plurality of spring clips connected to said support structure, said plurality of spring clips being configured to detachably receive said plurality of ball studs; and
an alignment mechanism configured to return said at least one monitor serving as a door to an aligned orientation and position with respect to said monitor array when said at least monitor serving as a door is closed.

18. A method of providing a multiple monitor array comprising:
arranging a plurality of monitors supported by a support structure comprising an opening providing access to objects behind an exterior of said support structure, wherein at least one monitor serves as a door for accessing objects disposed behind said at least one monitor, said at least one monitor that serves as a door covering at least a portion of said opening when in a closed position;
installing a hinge structure interposed between said support structure and said at least one monitor allowing said at least one monitor serving as a door to pivot about said hinge structure between an open position and said closed position;
providing a releasable fastener configured to secure said at least one monitor serving as a door to said support structure;
and providing an alignment mechanism configured to return said at least one monitor serving as a door to an aligned orientation and position with respect to said monitor array when said at least monitor serving as a door is closed, wherein said alignment mechanism includes a plurality of cones attached to said at least one monitor and a plurality of receptacles attached to said support structure, wherein said plurality of receptacles are configured to detachably receive said plurality of cones.

19. A multiple monitor array comprising:
a support structure comprising an opening providing access to objects behind an exterior of said support structure;
a plurality of monitors supported by said support structure wherein at least one monitor serves as a door for accessing objects disposed behind said at least one monitor, said at least one monitor that serves as a door covering at least a portion of said opening when in a closed position;
a hinge means, interposed between said support structure and said at least one monitor, for allowing said at least one monitor serving as a door to pivot between an open position and said closed position;
a securing means for securing said at least one monitor serving as a door to said support structure;
and an alignment means for returning said at least one monitor serving as a door to an aligned orientation and position with respect to said monitor array when said at least monitor serving as a door is closed, wherein said alignment means includes a plurality of cones attached to said at least one monitor and a plurality of receptacles attached to said support structure, wherein said plurality of receptacles are configured to detachably receive said plurality of cones.

20. A multiple monitor array comprising:
a support structure comprising an opening providing access to objects behind an exterior of said support structure;
a plurality of monitors supported by said support structure wherein at least one monitor serves as a door for accessing objects disposed behind said at least one monitor, said at least one monitor that serves as a door covering at least a portion of said opening when in a closed position;
a hinge means, interposed between said support structure and said at least one monitor, for allowing said at least one monitor serving as a door to pivot between an open position and said closed position;

a securing means for securing said at least one monitor serving as a door to said support structure; an alignment means for returning said at least one monitor serving as a door to an aligned orientation and position with respect to said monitor array when said at least monitor serving as a door is closed;

and a fine adjustment means for adjusting a position of said at least one monitor with respect to said hinge means, said fine adjustment means including a plurality of jack screws configured to adjust an elevation and roll degrees of freedom of said at least one monitor with respect to said hinge structure, a bracket attached to a rear of said at least one monitor, and a screw threaded through said bracket such that when said screw is threaded into or out of said bracket a tilt of said at least one monitor is adjusted.

* * * * *